March 24, 1953     R. F. EHAT     2,632,358
LIGHT SIGNAL TEST CIRCUIT FOR PHOTOCELLS
Filed Jan. 27, 1950
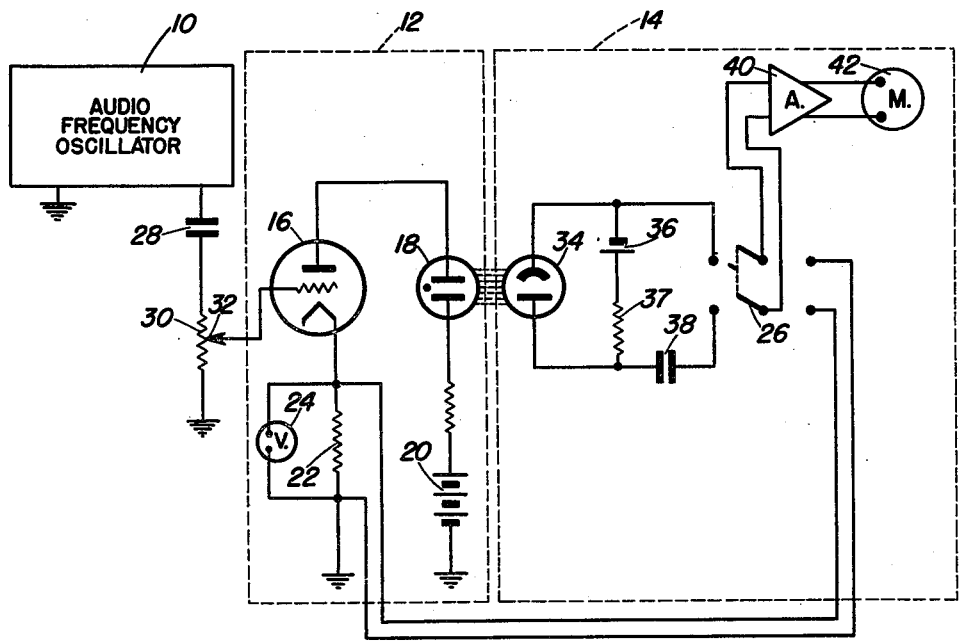
INVENTOR.
Raphael F. Ehat
BY
Attorney Patented Mar. 24, 1953

2,632,358

UNITED STATES PATENT OFFICE 2,632,358

LIGHT SIGNAL TEST CIRCUIT FOR PHOTOCELLS

Raphael F. Ehat, San Francisco, Calif.

Application January 27, 1950, Serial No. 140,923

6 Claims. (Cl. 88—14)

(Granted under Title 35, U. S. Code (1952), sec. 266)

The invention relates to test equipment and particularly to means for testing apparatus having a photo cell input.

Many types of apparatus, such as motion picture sound projectors, have a photo cell input. It is desirable to test this apparatus periodically, and heretofore it has been necessary to remove the photo cell from the apparatus and test the photo cell separately from the rest of the apparatus. This arrangement has proven awkward, and it is a prime object of the invention to provide means for testing apparatus of this type as a unit.

Briefly, the invention comprises a test circuit including means such as a glow tube for generating light signals for exciting the photo cell of the apparatus under test and means for indicating a variation in intensity of the light signals emitted from said glow tube. In one embodiment of the invention, the test circuit includes an amplifier stage wherein the glow tube is in the plate circuit thereof and wherein the means for indicating the variation in intensity of emitted light comprises a voltmeter connected across a resistor in series with the glow tube. A source of modulating voltage such as an audio frequency oscillator is connected across the input of the amplifier stage, and both the electrical and the light signal outputs of the amplifier stage are indicated by the voltmeter. The signal outputs are varied by varying the input to the amplifier stage, and the varying outputs are compared to the resultant varying signal outputs of the apparatus under test. By comparing the respective signal outputs, the operating characteristics of the apparatus under test can be determined.

For a better understanding of the invention, reference is made to the following specification of a presently preferred embodiment of the invention, said specification to be read in connection with the attached drawing, the single figure of which illustrates the invention positioned and connected for testing an apparatus having a photo cell input.

Reference is now made to the drawing wherein there is illustrated an audio frequency oscillator 10, a calibrated source of energy 12, and a circuit 14 having a photo cell input. Circuit 12, which comprises a source of both light and electrical energy for testing circuit 14, is essentially a cathode follower stage comprising a vacuum tube 16, here shown as a triode, a glow tube 18 characterized by a linear variation of light intensity with current, a source of electrical energy 20, and a cathode resistor 22. A voltmeter 24 is connected across the cathode resistor 22, as are a first set of poles of a double pole, double throw switch 26. Resistor 22 thus serves both as a source of a known voltage and as a source of a known electrical signal. The voltmeter 24 is preferably a vacuum tube voltmeter, since a vacuum tube voltmeter does not constitute a load across the resistor and therefore does not affect the operation of the circuit. The output of the audio frequency oscillator 10 is connected to the input circuit of the triode 16 through a blocking condenser 28 and a tapped grid bias resistor 30. It will be apparent that the D. C. grid bias of tube 16 will be determined by the chosen value of the cathode resistor 22, that the A. C. signal bias of the tube 16 will be determined by the setting of tap 32 of resistor 30, and that a variation of this A. C. signal bias will be indicated by voltmeter 24. Similarly, since the same current passes through the cathode resistor 22 as passes through the glow tube 18, it will be apparent that the intensity of the light signal emitted by the glow tube will vary as the voltage developed across the cathode resistor, and that therefore the voltmeter will indicate the variation in light intensity as well as the variation in input signal bias. It will thus be seen that source 12 comprises a source of electrical and light signal outputs of known values, since the voltmeter 24 can be used to indicate not only a variation in input voltage but also the resultant variation in electrical and light signal outputs.

Circuit 14, which represents a simplified schematic showing of a motion picture sound projector, includes a photo cell 34 having a source of electrical bias 36 in series with a load resistor 37 and connected through a blocking condenser 38 to the second set of poles of the switch 26. The output of photo cell 34 is applied through the switch 26 to an audio amplifier 40, the output of which is applied to a meter 42. In actual practice, meter 42 would be a loud speaker, but for purposes of test the speaker is conveniently replaced by any suitable meter for visually indicating the output of the amplifier 40.

Operation

In operation, the source of light 12 is moved up to the sound projector to be tested, and the glow tube 18 is so orientated relative thereto that light emitted therefrom will be directed upon the photo cell 34. The oscillator 10 is switched into operation and the tap 32 is adjusted to cause a desired amount of light signal to be emitted from the glow tube. The switch 26 is then moved to connect the photo tube 34 to the amplifier 40, and the readings of meters 24 and 42 are observed. If the circuit 14 is operating, a reading will be indicated on the meter 42, which reading will be a function of the amount of light signal exciting the photo cell 34. The intensity of the light signal directed upon the photo cell 34 is then varied by adjustment of tap 32, and the new readings of voltmeter 24 and the meter 42 are compared. If the projector is operating perfectly, the variation in light intensity as indicated by the voltmeter 24 will be reflected in a like variation in photo cell excitation as indicated by meter 42. For example, if the output of the glow tube 18 were doubled, the output of the photo cell 34 would be doubled, and this situation might be indicated by a doubling of the reading on the meters 24 and 42. If desirable, circuit 12 could, of course, be calibrated in terms of absolute values by first calibrating it against a photo cell input circuit of known characteristics.

If, however, this linear or otherwise characteristic were not indicated by correlation of meters 24 and 42, the switch 26 would be moved to connect the amplifier 40 across the cathode resistor 22, and the amplifier would then be checked against this known calibrated source of voltage. If the amplifier 40 checked correctly, it would then appear that the photo cell 34 was defective.

Having thus tested the sound projector for response to signals of varying amplitudes, the circuit can be tested for response to varying audio modulation frequencies by tuning oscillator 10 through a predetermined range of frequencies. Normally the photo cell used in sound projectors is relatively insensitive to variations in the audio frequency of modulation of the intensity of light signals within its spectrum of response, but it appears that a photo cell, shortly before breakdown thereof, becomes extremely sensitive to changes in the audio modulation frequency, and therefore imminent breakdown of a cell can be forecast by this method.

The accuracy of all of these tests is dependent on various factors, among which is the transfer characteristic of circuit 12. This characteristic is greatly stabilized by connecting tube 12 as a cathode follower, which arrangement is inherently insensitive to operating variables such as tube age, voltage changes and impedance variations. It will be apparent, of course, that this arrangement simply represents that which seems most accurate and convenient at this time, and that the invention is not to be limited to the use of a cathode follower connection. An audio frequency oscillator 10 has been employed as a source of modulating voltage because the invention has been illustrated by reference to a motion picture sound projector which includes an audio stage responsive to the output of the photo cell thereof. The invention, however, is not to be limited to the use of an audio frequency oscillator, since any source of modulating voltage can be used for producing variations in the output of the test circuit 12 with a resultant variation in the output of the apparatus under test.

There has thus been disclosed a method and means whereby an equipment having a photo cell input can be tested as a unit, and there has been further disclosed a method and means whereby the equipment can be tested separately from the photo cell input.

Obviously many modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

What is claimed is:

1. A test circuit for apparatus having a photo cell input comprising a source of modulating voltage, a glow tube for generating light of an intensity that is a direct function of the modulation of said voltage for exciting said photo cell, means for indicating the output of said photo cell, and alternatively operable means for indicating the input into said glow tube.

2. A system comprising a cathode follower stage, means for applying a modulating signal to the input circuit of said stage, a glow tube characterized by a linear variation of light intensity with current connected in the output circuit of said stage, means for measuring the electrical output of a photo cell to be tested, and an output stage of known value connected across the cathode resistor of said cathode follower stage whereby the output of said photo cell can be compared to the input into said glow tube.

3. A test circuit comprising a cathode follower stage, a glow tube in the plate circuit thereof and having a linear variation of light intensity with current, a cathode resistor, means for deriving an electrical signal from said cathode resistor, and a vacuum tube voltmeter connected across said cathode resistor.

4. The circuit according to claim 3 including means for varying the current through said glow tube and cathode resistor.

5. The system of claim 2 including electrically conducting means for alternatively electrically connecting said measuring means with the output of said photo cell and with said output stage.

6. A system of the character described for testing a photo cell comprising a glow tube, the light output of which is a known function of its electrical input, adapted to be positioned to illuminate said photo cell; means adapted to measure the output of said photo cell; means providing an electrical output related in a known manner to the electrical input to said glow tube, and means for alternatively connecting said measuring means with said photo cell and with said last mentioned means whereby the output of said photo cell can be compared with the input to said glow tube.

RAPHAEL F. EHAT.

REFERENCES CITED

The following references are of record in the file of this patent:

UNITED STATES PATENTS

| Number | Name | Date |
|---|---|---|
| 1,771,915 | Campbell et al. | July 29, 1930 |
| 1,906,597 | Hoare | May 2, 1933 |
| 1,993,890 | Langer | Mar. 12, 1935 |
| 2,408,589 | Wells | Oct. 1, 1946 |